15

United States Patent Office 3,658,812
Patented Apr. 25, 1972

3,658,812
CERTAIN 2-BENZIMIDAZOLE ALKYL
CARBAMATES
Don R. Baker, Orinda, Julius J. Menn, Saratoga, and
Ashley H. Freiberg, Santa Clara, Calif., assignors to
Stauffer Chemical Company, New York, N.Y.
No Drawing. Filed Apr. 22, 1970, Ser. No. 30,984
Int. Cl. C07d 49/38
U.S. Cl. 260—240 J                              4 Claims

ABSTRACT OF THE DISCLOSURE

Compounds corresponding to the formula

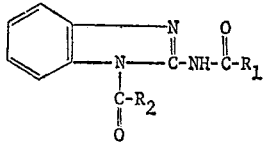

wherein $R_1$ is selected from alkoxy and alkoxyalkyl; $R_2$ is selected from alkyl, aryl, alkenyl, thioalkyl, alkylaryl, haloalkyl, cycloalkyl, haloalkenyl, alkoxyakyl, alkenylaryl, furanyl and carboalkoxy. The compositions described herein are useful as fungicides and biocides.

DESCRIPTION OF THE INVENTION

The present invention is concerned with a novel group of compounds which can be generally described as 2-benzimidazole carbamates, and their use as pesticides, especially effective against fungi and parasites.

The compounds are represented by the general formula

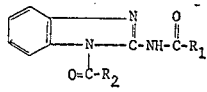

wherein, $R_1$ is selected from alkoxy and alkoxyalkyl; $R_2$ is selected from alkyl, aryl, alkenyl, thioalkyl, alkylaryl, haloalkyl, cycloalkyl, haloalkenyl, alkylalkoxy, alkenylaryl, furanyl, and carboalkoxy.

The compounds represented by the above formula can exist in two tautomeric forms as follows:

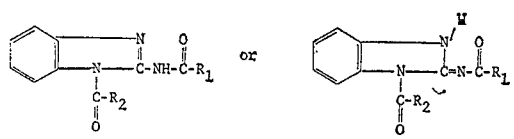

wherein $R_1$ and $R_2$ have been previously defined.

The compounds represented by the above general formulae are manufactured by reacting a 2-benzimidazole alkyl carbamate in an inert solvent with an acid chloride or other like material in the presence of an acid acceptor. The inert solvent can be selected from benzene, chloroform, or the like. The acid acceptor can be selected from triethyamine, pyridine, or the like. In order to illustrate the merits of the present invention, the following examples are provided.

EXAMPLE I 1-n-heptanoyl-2-benzimidazole methyl carbamate

A mixture was formed containing 9.5 gm. of 2-benzimidazole methylcarbamate in 100 ml. chloroform. Then 7.4 gm. of heptanoyl chloride was added followed by the dropwise addition of 7 ml. of triethylamine. A solid still remained so another 7.4 gm. of the acid chloride and 7.0 ml. of triethylamine was added portionwise with stirring at 20° to 30° C. After the addition was completed, the mixture was stirred for one hour, washed with 150 ml. water, sodium bicarbonate solution, dried over magnesium sulfate, and evaporated to yield an oil that crystallized from cold n-pentane to yield 12.9 gm. of the solid compound, having a melting point of between 78° and 80° C.

EXAMPLE II

Cyclohexylcarbonyl-2-benzimidazole carbamic acid,
methyl ester

A mixture of 9.5 gm. of 2-benzimidazole methyl carbamate and 150 ml. of chloroform was made. Then, 7.3 gm. of cyclohexane carbonyl chloride was added followed by dropwise addition of 7 ml. of triethylamine over a period of 30 minutes at 22° to 30° C. with stirring. The mixture was stirred for an additional 30 minutes and then washed with 50 ml. of water and filtered. The chloroform portion was dried over magnesium sulfate and evaporated in a vacuum to yield 9.2 gm. of a solid having a melting point of 180° to 185° C.

EXAMPLE III 1-benzoyl-2-benzimidazole carbamic acid methyl ester

A 7 ml. portion of triethylamine was added to a mixture of 9.5 gm. of 2-benzimidazole methylcarbamate, 100 ml. of chloroform and 8.5 ml. of benzoylchloride over a period of 15 minutes, at 20° to 26° C. After one hour, the reaction was still not complete so it was stirred overnight (16 hours). The mixture was diluted with water, filtered, and the chloroform solution was evaporated and dried over magnesium sulfate to give an oil that was washed with ethyl-ether to yield 8.4 gm. of a solid, having a melting point of 140° to 147° C.

Other compounds were prepared in an analogous manner starting with the appropriate starting materials, as outlined above. The following is a table of compounds representative of those embodied by the present invention. Compound numbers have been assigned to them and are used for identification throughout the balance of the specification.

TABLE 1

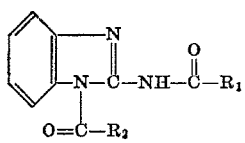

| Compound number | R₁ | R₂ |
|---|---|---|
| 1 | OCH₃ | (phenyl) |
| 2 | OCH₃ | SC₂H₅ |
| 3 | OCH₃ | (cyclohexyl) |
| 4 | OCH₃ | CH=CH₂ |
| 5 | OCH₃ | CH=CH—(phenyl) |
| 6 | OCH₃ | —C(=O)—O—C₂H₅ |
| 7 | OCH₃ | (furyl) |
| 8 | OCH₂CH₂OCH₃ | CH₃ |
| 9 | OCH₃ | CH₂—(phenyl) |
| 10 | OCH₃ | —CH₂—CH(CH₃)—CH₂—C(CH₃)₂—CH₃ |
| 11 | OCH₃ | CCl=CCl₂ |
| 12 | OCH₃ | CH₂OCH₃ |
| 13 | OCH₃ | CH₂=C(CH₃)₂ |
| 14 | OCH₃ | CH₂Cl |
| 15 | OCH₃ | CCl₃ |
| 16 | OCH₃ | CF₃ |
| 17 | OCH₃ | (CH₂)₅CH₃ |
| 18 | OCH₃ | CH₂CH₂—(phenyl) |

FUNGICIDE TESTING PROCEDURES (A) Foliar preventative sprays (1) Bean rust.—The chemicals are dissolved in an appropriate solvent and diluted with water containing several drops of Tween-20, a wetting agent. Test concentrations, ranging from 1000 p.p.m. downward, are sprayed to runoff on the primary leaves of pinto beans (*Phaseolus vulgaris* L.). After the leaves are dried, they are inoculated with a water suspension of spores of the bean rust fungus (*Uromyces phaseoli* Arthur) and the plants are placed in an environment of 100% humidity for 24 hours. The plants are then removed from the humidity chamber and held until disease pustules appear on the leaves. Effectiveness is recorded as percent reduction in number of pustules as compared to untreated inoculated plants.

(2) Bean powdery mildew.—Test chemicals are prepared and applied in the same manner as for the bean rust test. After the plants are dry, the leaves are dusted with spores of the powdery mildew fungus (*Erysiphe polygoni* De Candolle) and the plants are retained in the greenhouse until the fungal growth appears in the leaf surfaces. Effectiveness is recorded as percent of the leaf surface free of fungal growth as compared to untreated inoculated plants.

(B) Foliar eradicative sprays (1) Bean powdery mildew.—Untreated pinto bean plants are dusted with spores of the powdery mildew fungus and maintained in the greenhouse until mycelial growth appears in the leaf surface. Test chemicals are then prepared and applied in the same manner as for the preventative spray test. Four days later the leaves are examined for inhibition of further mycelial growth. Eradicative effectiveness is recorded as the percentage of inhibition of viable, sporulating mycelium as compared to untreated inoculated plants.

(C) Tube systemic test (1) Bean rust.—The chemicals are dissolved in an appropriate solvent and diluted with tap water to a series of descending concentrations beginning at 50 p.p.m. Sixty ml. of each concentration are placed in a test tube. A pinto bean plant is placed in each tube and supported with a piece of cotton so that only the roots and lower stem are in contact with the test solution. Forty-eight hours later the bean leaves are inoculated with a water suspension of spores of the bean rust fungus and placed in an environment with 100% humidity for 24 hours. The plants are then removed from the humidity chamber and maintained in the greenhouse until the disease pustules appear on the leaves. Effectiveness is recorded as the lowest concentration, in p.p.m., which will provide 50% reduction in pustule formation as compared to untreated, inoculated plants.

(2) Bean powdery mildew.—Test chemicals are prepared and applied in the same manner as for the bean rust systemic test. After two days the leaves are dusted with spores of the powdery mildew fungus and maintained in the greenhouse until mycelial growth appears in the leaf surfaces. Effectiveness is recorded as the lowest concentration, in p.p.m., which will provide a 50% reduction in mycelial growth on the leaf surface as compared to untreated, inoculated plants.

BIOCIDE TESTING PROCEDURES

Tubes of sterilized nutrient and malt extract broth are prepared. Aliquots of the toxicant, dissolved in an appropriate solvent, are injected through the stopper, into the broth, to provide concentrations ranging from 50 p.p.m. downward. The test organisms consist of two fungi, *Aspergillus niger* (*A.n*) van Tieghem and *Penicillium italicum* (*P.i.*) Wehmer, and two bacteria, *Escherichia coli* (*E.c.*) Migula and *Staphylococcus aureus* (*S.a.*) Rosenbach. Three drops of a spore suspension of each of the fungi are injected into the tubes of malt broth and three drops of the bacteria are injected into the nutrient broth. One week later the growth of each organism is observed and effectiveness of the chemical is recorded as the lowest concentration in p.p.m. which provides 50% inhibition of growth as compared to untreated inoculated tubes.

The results of the above tests are set forth in the following table.

TABLE II

| Compound number | In vitro vial (p.p.m.) | | | | Preventative sprays, p.p.m. | | | | | | | | Eradicative sprays, p.p.m. | | | Tube systemic, p.p.m. | |
|---|---|---|---|---|---|---|---|---|---|---|---|---|---|---|---|---|---|
| | | | | | Rust | | | Mildew | | | | | | Mildew | | | |
| | A.n. | P.i. | E.c. | S.a. | 1,000 | 500 | 100 | 1,000 | 500 | 100 | 50 | 25 | 10 | 1,000 | 500 | 100 | Rust | Mildew |
| 1 | 5 | 0.03 | >50 | >50 | 100 | 100 | 98 | 100 | 100 | 100 | 100 | 100 | 99 | 0 | 0 | 0 | 5 | 0.06 |
| 2 | 1 | 0.06 | >50 | >50 | | | | 100 | 100 | 100 | 100 | 75 | 50 | 50 | 0 | 0 | | 0.5 |
| 3 | 5 | 0.25 | >50 | >50 | 100 | 98 | 85 | 100 | 100 | 100 | 100 | 100 | 99 | 25 | 25 | 0 | 1 | 0.25 |
| 4 | 10 | 0.25 | >50 | >50 | 95 | 95 | 50 | 100 | 100 | 100 | 99 | 95 | 80 | 0 | 0 | 0 | 10 | 0.25 |
| 5 | 5 | 0.06 | >50 | >50 | 100 | 98 | 95 | 100 | 100 | 100 | 100 | 100 | 99 | 50 | 50 | 25 | 10 | 0.50 |
| 6 | 5 | 0.03 | >50 | >50 | 98 | 98 | 95 | 100 | 100 | 100 | 100 | 98 | 98 | 50 | 25 | 0 | 1 | 0.06 |
| 7 | 5 | 0.03 | >50 | >50 | 100 | 100 | 75 | 100 | 100 | 100 | 100 | 90 | 65 | 50 | 50 | 25 | 5 | 0.25 |
| 8 | >50 | 5 | >50 | >50 | 0 | | | 0 | | | | | | | | | >50 | 5 |
| 9 | 5 | 0.06 | >50 | >50 | 98 | 95 | 75 | 100 | 100 | 100 | 75 | 0 | | 25 | 0 | 0 | 1 | 0.13 |
| 10 | 5 | 0.06 | >50 | >50 | 99 | 98 | 95 | 100 | 100 | 100 | 100 | 95 | | 25 | 25 | 0 | 5 | 0.25 |
| 11 | 25 | 0.25 | >50 | 10 | 98 | 90 | 50 | 100 | 100 | 50 | 0 | | | 50 | 25 | 0 | 5 | 0.20 |
| 12 | 5 | 0.06 | >50 | >50 | 100 | 95 | 25 | 100 | 100 | 100 | 50 | 25 | | 25 | 0 | 0 | 1 | 0.13 |
| 13 | 10 | 0.13 | >50 | >50 | 100 | 100 | 95 | 100 | 100 | 100 | 100 | 95 | | 50 | 25 | 0 | 5 | 0.13 |
| 14 | 5 | 0.06 | >50 | >50 | 75 | 50 | 0 | 99 | 99 | 80 | 0 | | | 0 | 0 | 0 | 5 | 0.25 |
| 15 | 5 | 0.06 | >50 | >50 | 99 | 75 | 25 | 95 | 80 | 75 | 25 | | | 25 | 0 | 0 | 5 | 0.25 |
| 16 | 5 | 0.03 | >50 | >50 | 100 | 98 | 80 | 100 | 99 | 90 | | | | 25 | 0 | 0 | 5 | 0.13 |
| 17 | 5 | 0.13 | >50 | >50 | 100 | 100 | 75 | 100 | 100 | 100 | 100 | 98 | | 25 | 0 | 0 | 5 | <1.0 |
| 18 | 5 | 0.06 | >50 | >50 | 98 | 95 | 58 | 100 | 100 | 100 | 95 | 75 | | 25 | 0 | 0 | 5 | <1.0 |

ANTHELMINTIC TESTING METHODS

(I) Feed testing

Combined observations of safety and efficacy of compounds fed continuously in the diet of mice were made against: *Nematospiroides dubius* (N.d.), a non-migrating trichostrongyle nematode; *Nippostrongylus muris* (N.m.), a migrating trichostrongyle nematode; *Syphacia obvelata* (S.o.), a cecal pinworm; *Aspiculuris tetraptera* (A.t.), an intestinal pinworm; and *Hymenolepis nana* (H.n.), an intestinal tapeworm.

The experimental compounds were weighed out in specific amounts, premixed with powdered feed in a mortar and pestle, and blended in a power mixer for 30 to 40 minutes.

Young Swiss Webster mice (12 to 24 g. body weight) were obtained from local animal hubsandry centers and housed in pairs in hardware cloth cages. These mice were put on medicated rations supplied in tared wateproof containers two days prior to inducing infections. Drinking water was supplied ad lib in drip bottles. Feed consumption and weight variations were recorded after the first week to assess subclinical toxicity and palatibility.

After 21 days on medicate feed, mice were necropsied and the parasites remaining in the entire small intestine, cecum, and colon counted and differentiated. This was done by compressing the intestinal trace between two 3" x 4" glass plates and examining them under low power magnification. The average number of each species remaining in the medicated groups was compared to average numbers of each species in conrtols. This figure was then subtracted from 100% to yield the percent efficacy.

(II) Oral dose testing

This test was conducted under the same protocol as the feed test, except:
(1) The helminth infections were administered 21 days prior to drug administration.
(2) The experimental compounds were formulated as solutions in Tween 20® and administered orally by stomach tube in mg./kg. dosages.
(3) The sacrifice of the mice was carried out 1 to 3 days following drug administration, and the results are therefore indicative of therapeutic activity.

The results of the above tests are set forth in Table III.

TABLE III

| Compound number | P.p.m. or lethal to mice [1] | Percent efficacy | | | | |
|---|---|---|---|---|---|---|
| | | N.d. | N.m. | H.n. | S.o. | A.t. |
| 1 | >250 | 90 | 40 | 0 | 100 | 0 |
| | [1] >100 | 0 | 0 | 0 | 0 | 0 |
| 2 | [1] >100 | 0 | 95 | 50 | 50 | 50 |
| 3 | >500 | 100 | 100 | 50 | 100 | 100 |
| | [1] >100 | 0 | 0 | 0 | 90 | 50 |
| 4 | >750 | 30 | 0 | 0 | 100 | 0 |
| | [1] >100 | 0 | 0 | 0 | 0 | 0 |
| 5 | >750 | 100 | 100 | 0 | 100 | 100 |
| | [1] >50 | 0 | 0 | | 50 | 60 |
| 6 | >750 | 100 | 100 | 100 | 100 | 100 |
| | [1] >50 | 40 | 0 | 0 | 0 | 40 |
| 7 | 500 | 100 | 70 | 100 | 100 | 100 |
| | [1] >50 | 0 | 0 | 0 | 50 | 0 |
| 8 | >500 | 0 | 30 | 0 | 0 | 70 |
| | [1] >100 | 0 | 0 | | 0 | 0 |
| 9 | >500 | 100 | 100 | 100 | 100 | 100 |
| | [1] >100 | 0 | 0 | | 80 | 100 |
| 10 | 500 | 100 | 80 | 50 | 100 | 50 |
| | [1] >100 | 70 | 0 | | 90 | 90 |
| 11 | 250 | 50 | 30 | 0 | 100 | 0 |
| 12 | >500 | 100 | 100 | 50 | 100 | 70 |
| | [1] >100 | 20 | 0 | | 0 | 0 |
| 13 | >500 | 60 | 60 | 0 | 90 | 50 |
| 14 | >500 | 100 | 100 | 100 | 100 | 100 |
| 15 | >500 | 100 | 95 | 100 | 100 | 100 |
| 16 | | | | | | |
| 17 | | | | | | |
| 18 | | | | | | |

[1] Mg./kg. body weight.

What is claimed is:
1. A composition of matter having the formula

wherein $R_1$ is methoxy; $R_2$ is selected from a group consisting of furanyl, styryl and benzyl.

2. The composition of matter as set forth in claim 1, wherein $R_2$ is styryl.

3. The composition om matter as set forth in claim 1, wherein $R_2$ is furanyl.

4. The composition of matter as set forth in claim 1, wherein $R_2$ is benzyl.

References Cited

UNITED STATES PATENTS 3,541,213  11/1970  Klopping _____ 260—309.2

FOREIGN PATENTS 1,523,597  3/1968  France _____ 260—309.2

NATALIE TROUSOF, Primary Examiner

U.S. Cl. X.R.

424—273